(12) United States Patent
Lai et al.

(10) Patent No.: US 8,092,973 B2
(45) Date of Patent: Jan. 10, 2012

(54) TONER COMPOSITIONS

(75) Inventors: Zhen Lai, Webster, NY (US);
Chieh-Min Cheng, Rochester, NY (US);
Robert D. Bayley, Fairport, NY (US);
Grazyna E. Kmiecik-Lawrynowicz, Fairport, NY (US); Maura A. Sweeney, Irondequoit, NY (US); Daniel G. Marsh, Webster, NY (US); Emily L. Moore, Mississauga, CA (US); Shigang Qiu, Toronto (CA); Tie Hwee Ng, Mississauga, CA (US)

(73) Assignee: Xerox Corporation, Norwalk, CT (US)

( * ) Notice: Subject to any disclaimer, the term of this patent is extended or adjusted under 35 U.S.C. 154(b) by 793 days.

(21) Appl. No.: 12/106,463

(22) Filed: Apr. 21, 2008

(65) Prior Publication Data
US 2009/0263740 A1 Oct. 22, 2009

(51) Int. Cl.
*G03G 5/00* (2006.01)
(52) U.S. Cl. .............................. 430/137.15; 430/137.17
(58) Field of Classification Search ............... 430/137.1, 430/137.14, 137.15, 137.17; 524/306, 311, 524/501, 804–836
See application file for complete search history.

(56) References Cited

U.S. PATENT DOCUMENTS

| | | | |
|---|---|---|---|
| 2,874,063 A | 2/1959 | Greig | |
| 3,590,000 A | 6/1971 | Palermiti et al. | |
| 3,655,374 A | 4/1972 | Palermiti et al. | |
| 3,720,617 A | 3/1973 | Chatterji et al. | |
| 3,944,493 A | 3/1976 | Jadwin et al. | |
| 3,983,045 A | 9/1976 | Jugle et al. | |
| 4,007,293 A | 2/1977 | Mincer et al. | |
| 4,079,014 A | 3/1978 | Burness et al. | |
| 4,265,990 A | 5/1981 | Stolka et al. | |
| 4,394,430 A | 7/1983 | Jadwin et al. | |
| 4,560,635 A | 12/1985 | Hoffend et al. | |
| 4,563,408 A | 1/1986 | Lin et al. | |
| 4,584,253 A | 4/1986 | Lin et al. | |
| 4,797,339 A | 1/1989 | Maruyama | |
| 4,858,884 A | 8/1989 | Harwath | |
| 4,935,326 A | 6/1990 | Creatura et al. | |
| 4,937,166 A | 6/1990 | Creatura et al. | |
| 4,983,488 A | 1/1991 | Tan | |
| 4,996,127 A | 2/1991 | Hasegawa | |
| 5,227,460 A | 7/1993 | Mahabadi et al. | |
| 5,278,020 A | 1/1994 | Grushkin | |
| 5,290,654 A | 3/1994 | Sacripante | |
| 5,308,734 A | 5/1994 | Sacripante | |
| 5,344,738 A | 9/1994 | Kmiecik-Lawrynowicz | |
| 5,346,797 A | 9/1994 | Kmiecik-Lawrynowicz et al. | |
| 5,348,832 A | 9/1994 | Sacripante | |
| 5,364,729 A | 11/1994 | Kmiecik-Lawrynowicz et al. | |
| 5,366,841 A | 11/1994 | Patel | |
| 5,370,963 A | 12/1994 | Patel | |
| 5,403,693 A | 4/1995 | Patel et al. | |
| 5,405,728 A | 4/1995 | Hopper | |
| 5,418,108 A | 5/1995 | Kmiecik-Lawrynowicz et al. | |
| 5,496,676 A | 3/1996 | Croucher | |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,853,943 A | 12/1998 | Cheng et al. | |
| 5,922,501 A * | 7/1999 | Cheng et al. .............. | 430/137.14 |
| 6,004,714 A | 12/1999 | Ciccarelli et al. | |
| 6,190,815 B1 | 2/2001 | Ciccarelli et al. | |
| 6,458,501 B1 | 10/2002 | Cheng | |
| 6,503,680 B1* | 1/2003 | Chen et al. ............... | 430/137.14 |
| 6,962,764 B2 | 11/2005 | Vanbesien | |
| 7,001,702 B2 | 2/2006 | Cheng | |
| 7,041,420 B2 | 5/2006 | Vandewinckel | |
| 7,186,494 B2 | 3/2007 | Ahuja | |
| 7,279,261 B2 | 10/2007 | Lee et al. | |
| 7,307,111 B2 | 12/2007 | Moffat et al. | |
| 2002/0049275 A1 | 4/2002 | Cheng | |
| 2003/0215732 A1 | 11/2003 | Uchida | |
| 2004/0202950 A1 | 10/2004 | Ahuja | |
| 2005/0137278 A1 | 6/2005 | Fromm | |
| 2006/0089425 A1* | 4/2006 | Chopra et al. ................ | 523/206 |
| 2006/0121383 A1 | 6/2006 | Zwartz | |
| 2006/0154162 A1* | 7/2006 | Zhou et al. ................. | 430/108.1 |
| 2006/0172220 A1 | 8/2006 | Patel et al. | |
| 2006/0240353 A1 | 10/2006 | Matsumura | |
| 2006/0257777 A1 | 11/2006 | Matsumura | |
| 2006/0269858 A1 | 11/2006 | McDougall et al. | |
| 2007/0037086 A1 | 2/2007 | Skorokhod et al. | |
| 2007/0166635 A1 | 7/2007 | Yamamoto | |
| 2007/0207400 A1 | 9/2007 | Ahuja et al. | |
| 2008/0299478 A1* | 12/2008 | Bayley et al. .............. | 430/111.4 |
| 2009/0081576 A1* | 3/2009 | Bayley et al. ............ | 430/137.17 |

FOREIGN PATENT DOCUMENTS

| EP | 1 653 290 | 5/2006 |
|---|---|---|
| EP | 1 666 976 | 6/2006 |

OTHER PUBLICATIONS

European Search Report dated Jul. 23, 2009 for European Patent Appln. No. EP 09 15 3200.

* cited by examiner

*Primary Examiner* — Mark F Huff
*Assistant Examiner* — Stewart Fraser
(74) *Attorney, Agent, or Firm* — MDIP LLC (57) ABSTRACT

The present disclosure provides processes for reducing the particle size of latex resins and toners produced with such resins. In embodiments, a gel latex may be formed as a seed particle and then utilized to form latex resins and toner particles. In accordance with the present disclosure, one may be able to utilize materials for the production of latex resins and toners which may otherwise produce particles that are too large in the absence of the gel latex.

20 Claims, 1 Drawing Sheet

TONER COMPOSITIONS

BACKGROUND

The present disclosure relates to processes useful in providing toners suitable for electrostatographic apparatuses, including xerographic apparatuses such as digital, image-on-image, and similar apparatuses.

Numerous processes are known for the preparation of toners, such as, for example, conventional processes wherein a resin is melt kneaded or extruded with a pigment, micronized and pulverized to provide toner particles. Toner can also be produced by emulsion aggregation methods. Methods of preparing an emulsion aggregation (EA) type toner are within the purview of those skilled in the art, and toners may be formed by aggregating a colorant with a latex polymer formed by emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,403,693, 5,418,108, 5,364,729, and 5,346,797, the disclosures of each of which are hereby incorporated by reference in their entirety. Other processes are disclosed in U.S. Pat. Nos. 5,527,658, 5,585,215, 5,650,255, 5,650,256 and 5,501,935, the disclosures of each of which are hereby incorporated by reference in their entirety.

The variability of quality in the materials utilized to form the latexes utilized therein, as well as the presence of impurities in the starting materials, may result in the formation of particles that are too large in size and thus unsuitable for their intended use.

Improved methods for producing toner, which minimize sensitivity to variations in starting materials and are capable of utilizing existing processing equipment and machinery, remain desirable.

SUMMARY

Methods for producing toners and toners produced thereby are provided. In embodiments, methods of the present disclosure may include forming an emulsion by contacting monomer components of a latex resin with a stabilizer of the following formula:

where R1 is a hydrogen or methyl group, R2 and R3 are independently selected from alkyl groups containing about 1 to about 12 carbon atoms and a phenyl group, and n is from about 0 to about 20; adding a portion of the emulsion to a reactor; contacting the emulsion in the reactor with a crosslinker; optionally adding an initiator to the reactor; forming a seed particle comprising a gel latex in the reactor; adding additional monomers comprising the latex resin and optionally additional stabilizer to the reactor; and recovering the resulting latex resin, wherein the gel latex is present in an amount sufficient to reduce the particle size of the resulting latex resin.

In other embodiments, a process of the present disclosure may include forming an emulsion by contacting monomer components of a latex resin with a crosslinker; adding an initiator to the emulsion to form a master batch comprising a gel latex; adding a portion of the master batch to a reactor; adding additional monomer components of the latex resin and a stabilizer of the following formula:

where R1 is a hydrogen or methyl group; R2 and R3 are independently selected from alkyl groups containing from about 1 to about 12 carbon atoms and a phenyl group; and n is a number of from about 0 to about 20; and recovering the resulting latex resin, wherein the gel latex is present in an amount sufficient to reduce the particle size of the resulting latex resin.

In yet other embodiments, a process of the present disclosure may include forming an emulsion by contacting monomers selected from the group consisting of styrenes, acrylates, methacrylates, butadienes, isoprenes, acrylic acids, methacrylic acids, acrylonitriles, and combinations thereof, with a crosslinker selected from the group consisting of divinyl benzene, dodecane diacrylate, 1,4-butane diacrylate, decanediol diacrylate, azidobenzoyl hydrazide, 4-(p-azidosalicylamido)butylamine, 1-ethyl-3-(3-dimethylaminopropyl)carbodiimide hydrochloride, and combinations thereof, and a stabilizer comprising beta carboxyethyl acrylate; adding an initiator to the emulsion to form a master batch comprising a gel latex; adding a portion of the master batch to a reactor; adding additional monomers and optionally additional stabilizer to the reactor; and recovering a resulting latex resin, wherein the gel latex is present in an amount sufficient to reduce the particle size of the resulting latex resin.

BRIEF DESCRIPTION OF THE FIGURES

Various embodiments of the present disclosure will be described herein below with reference to the figures wherein.

DETAILED DESCRIPTION OF EMBODIMENTS

The present disclosure provides processes for the preparation of toner particles which may avoid problems which arise from the presence of impurities and/or variability in the materials utilized to prepare latex resins which, in turn, may be utilized to produce the toner particles. In embodiments, the toner particles of the present disclosure may be produced utilizing a gel latex in formation of a seed resin, sometimes referred to herein, in embodiments, as a seed particle, which may then be utilized to produce latex resins suitable for the production of toner particles having desired physical characteristics and morphologies. Surprisingly, it has been found that the use of a gel latex as a seed particle may produce latex resins having suitable particle sizes, even where impurities or variabilities in other starting materials utilized in forming the resin might otherwise result in latex resins having undesirable physical characteristics and morphologies, in embodiments particle sizes that are undesirably large.

Toners disclosed herein are prepared by combining a latex polymer and a pigment. While the latex may be prepared by any method within the purview of one skilled in the art, in embodiments the latex may be prepared by emulsion polymerization methods and the toner may include emulsion aggregation toners. Emulsion aggregation involves aggregation of both submicron latex and pigment particles into toner size particles, where the growth in particle size is, for example, submicron, in embodiments from about 3 microns to about 10 microns. In embodiments, the latex and resulting toner may be produced by a semi-continuous polymerization process in which a seed particle is first formed, after which additional monomers and materials utilized to form the latex may be added. The resulting latex, in turn, may be utilized to form toner particles of the present disclosure. In other embodiments, a batch emulsion polymerization process may be utilized to form a latex and resulting toner.

Resin

Any monomer suitable for preparing a latex emulsion can be used in the present processes. Suitable monomers useful in forming the latex emulsion, and thus the resulting latex particles in the latex emulsion include, but are not limited to, styrenes, acrylates, methacrylates, butadienes, isoprenes, acrylic acids, methacrylic acids, acrylonitriles, combinations thereof, and the like, as well as mixtures thereof.

In embodiments, the resin of the latex may include at least one polymer. In embodiments, at least one may be from about one to about twenty and, in embodiments, from about three to about ten. Exemplary polymers include copolymers of styrene and acrylates, copolymers of styrene and butadiene, copolymers of styrene and methacrylates, and more specifically, poly(styrene-co-alkyl acrylate), poly(styrene-co-butadiene), poly(styrene-co-alkyl methacrylate), poly(styrene-co-alkyl acrylate-co-acrylic acid), poly(styrene-co-1,3-butadiene-co-acrylic acid), poly(styrene-co-alkyl methacrylate-co-acrylic acid), poly(alkyl methacrylate-co-alkyl acrylate), poly(alkyl methacrylate-co-aryl acrylate), poly(aryl methacrylate-co-alkyl acrylate), poly(alkyl methacrylate-co-acrylic acid), poly(styrene-co-alkyl acrylate-co-acrylonitrile-acrylic acid), poly(styrene-co-butadiene-co-acrylonitrile-co-acrylic acid), poly(alkyl acrylate-co-acrylonitrile-co-acrylic acid), poly(methylstyrene-co-butadiene), poly(methyl methacrylate-co-butadiene), poly(ethyl methacrylate-co-butadiene), poly(propyl methacrylate-co-butadiene), poly(butyl methacrylate-co-butadiene), poly(methyl acrylate-co-butadiene), poly(ethyl acrylate-co-butadiene), poly(propyl acrylate-co-butadiene), poly(butyl acrylate-co-butadiene), poly(styrene-co-isoprene), poly(methylstyrene-co-isoprene), poly(methyl methacrylate-co-isoprene), poly(ethyl methacrylate-co-isoprene), poly(propyl methacrylate-co-isoprene), poly(butyl methacrylate-co-isoprene), poly(methyl acrylate-co-isoprene), poly(ethyl acrylate-co-isoprene), poly(propyl acrylate-co-isoprene), poly(butyl acrylate-co-isoprene), poly(styrene-co-propyl acrylate), poly(styrene-co-butyl acrylate), poly(styrene-co-butadiene-co-methacrylic acid), poly(styrene-co-butyl acrylate-co-acrylic acid), poly(styrene-co-butyl acrylate-co-methacrylic acid), poly(styrene-co-butyl acrylate-co-acrylonitrile), poly(styrene-co-butyl acrylate-co-acrylonitrile-acrylic acid), poly(styrene-co-butyl methacrylate), poly(styrene-co-butyl methacrylate-co-acrylic acid), poly(butyl methacrylate-co-butyl acrylate), poly(butyl methacrylate-co-acrylic acid), poly(acrylonitrile-co-butyl acrylate-co-acrylic acid), and mixtures and combinations thereof.

The polymers may be block, random, grafting, or alternating copolymers. In addition, polyester resins obtained from the reaction of bisphenol A and propylene oxide or propylene carbonate, and in particular including such polyesters followed by the reaction of the resulting product with fumaric acid (as disclosed in U.S. Pat. No. 5,227,460, the disclosure of which is hereby incorporated by reference in its entirety), and branched polyester resins resulting from the reaction of dimethylterephthalate with 1,3-butanediol, 1,2-propanediol, and/or pentaerythritol, may also be used.

In embodiments, a poly(styrene-co-butyl acrylate) may be used as the latex resin. The glass transition temperature of this latex may be from about 35° C. to about 75° C., in embodiments from about 40° C. to about 65° C.

In embodiments, the latex may be prepared in an aqueous phase containing a surfactant or co-surfactant. Surfactants which may be utilized with this aqueous phase and result in the formation of a latex dispersion can be ionic or nonionic surfactants in an amount of from about 0.01 to about 15 weight percent of the solids, and in embodiments of from about 0.1 to about 10 weight percent of the solids.

Anionic surfactants which may be utilized include sulfates and sulfonates, disulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., mixtures thereof, and the like. Other suitable surfactants include, in embodiments, DOWFAX™ 2A1, an alkyldiphenyloxide disulfonate from The Dow Chemical Company, optionally in combination with any of the foregoing anionic surfactants.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and dodecyl trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, and the like, and mixtures thereof. In embodiments, a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, combinations thereof, and the like. In embodiments, commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be utilized.

The choice of particular surfactants or combinations thereof, as well as the amounts of each to be used, are within the purview of those skilled in the art.

In embodiments, a gel latex may be utilized to form a latex resin suitable for producing a toner composition. A "gel latex" may include, in embodiments, for example, a crosslinked resin or polymer, or mixtures thereof, or a non-crosslinked resin that has been subjected to crosslinking.

In embodiments, a crosslinker, such as divinyl aromatic or divinyl acrylate or methacrylate monomers, or diacrylic or dimethacrylic monomers, may be used to form the crosslinked resin. Suitable crosslinkers include, but are not limited to, divinyl benzene, dodecane diacrylate, 1,4-butane diacrylate, decanediol diacrylate, azidobenzoyl hydrazide, 4-(p-azidosalicylamido)butylamine (ASBA), 1-ethyl-3-(3-dimethylaminopropyl)carbodiimide hydrochloride (EDC), combinations thereof, and the like. The crosslinker may be present in an amount of from about 0.01 percent by weight to about 25 percent by weight of the crosslinked resin, and in embodiments of from about 0.5 to about 15 percent by weight of the crosslinked resin.

In embodiments, the gel latex may include a crosslinked resin as described above combined with a non-crosslinked resin.

The gel latex may include, for example, submicron crosslinked resin particles having a size of, for example, from about 10 nanometers to about 200 nanometers in volume average diameter, in embodiments of from about 20 nanometers to 100 nanometers in volume average diameter. The gel latex may be suspended in the aqueous phase of water containing a surfactant as described above. The surfactant may be present in an amount from about 0.5 to about 5 percent by weight of the solids, and in embodiments from about 0.7 to about 2 percent by weight of the solids.

The crosslinked resin may be a crosslinked polymer including any of the resins described above. Examples of such crosslinked resins include crosslinked styrene acrylates, styrene butadienes, and/or styrene methacrylates. Exemplary crosslinked resins include, but are not limited to, crosslinked poly(styrene-alkyl acrylate), poly(styrene-butadiene), poly(styrene-isoprene), poly(styrene-alkyl methacrylate), poly(styrene-alkyl acrylate-acrylic acid), poly(styrene-butadiene-acrylic acid), poly(styrene-isoprene-acrylic acid), poly(styrenealkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile acrylic acid), crosslinked poly(alkyl acrylate-acrylonitrile-acrylic acid), and combinations thereof.

In embodiments initiators may be added for formation of the gel latex, the latex, or both. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate, and mixtures thereof. Other water-soluble initiators which may be utilized include azoamidine compounds, for example 2,2'-azobis(2-methyl-N-phenylpropionamidine)dihydrochloride, 2,2'-azobis[N-(4-chlorophenyl)-2-methylpropionamidine]di-hydrochloride, 2,2'-azobis[N-(4-hydroxyphenyl)-2-methyl-propionamidine] dihydrochloride, 2,2'-azobis[N-(4-amino-phenyl)-2-methylpropionamidine]tetrahydrochloride, 2,2'-azobis[2-methyl-N(phenylmethyl)propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4, 5,6,7-tetrahydro-1H-1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis{2-[1-(2-hydroxyethyl)-2-imidazolin-2-yl]propane}dihydrochloride, combinations thereof, and the like.

Initiators can be added in suitable amounts, such as from about 0.1 to about 8 weight percent of the monomers, and in embodiments of from about 0.2 to about 5 weight percent of the monomers.

In embodiments, chain transfer agents may be used in forming the gel latex, the latex, or both. Suitable chain transfer agents include, but are not limited to, dodecane thiol, octane thiol, carbon tetrabromide, combinations thereof, and the like, in amounts from about 0.05 to about 10 percent by weight of the monomers and, in embodiments, from about 0.1 to about 5 percent by weight of monomers, to control the molecular weight properties of the polymer when emulsion polymerization is conducted in accordance with the present disclosure.

In embodiments, a gel latex may be formed as described in U.S. Pat. No. 7,307,111 and U.S. Patent Application Publication Nos. 2007/0207400, 2007/0037086, and 2006/0269858, the disclosures of each of which are hereby incorporated by reference in their entirety.

The amount of gel latex in a latex polymer may be from about 0.1% to about 20% by weight of the other monomers utilized to form the latex, in embodiments from about 0.5% to about 10% by weight of the other monomers utilized to form the latex.

Stabilizers

In embodiments, it may be advantageous to include a stabilizer when forming the latex resin. Suitable stabilizers include monomers having carboxylic acid functionality. In embodiments, suitable stabilizers may be of the following formula (I):

where R1 is hydrogen or a methyl group; R2 and R3 are independently selected from alkyl groups containing from about 1 to about 12 carbon atoms or a phenyl group; and n is from about 0 to about 20, in embodiments from about 1 to about 10. Examples of such stabilizers include beta carboxyethyl acrylate (sometimes referred to herein as poly(2-carboxyethyl)acrylate) (β-CEA), poly(2-carboxyethyl)acrylate, 2-carboxyethyl methacrylate, combinations thereof, and the like.

In embodiments, the stabilizer having carboxylic acid functionality may also contain metallic ions, such as sodium, potassium and/or calcium, to achieve better emulsion polymerization results. The metallic ions may be present in an amount from about 0.001 to about 10 percent by weight of the stabilizer having carboxylic acid functionality, in embodiments from about 0.5 to about 5 percent by weight of the stabilizer having carboxylic acid functionality.

It may be desirable, in embodiments, to include an acrylate such as a beta-carboxyethyl acrylate (β-CEA) in forming the latex. Thus, in embodiments, a poly(styrene-butyl acrylate-beta-carboxyethyl acrylate) may be utilized as the latex. The glass transition temperature of this latex may be from about 45° C. to about 65° C., in embodiments from about 48° C. to about 62° C.

One potential issue which may arise with the use of the above stabilizers is the variability which may occur in the formation of multiple batches of stabilizers. The consistency of the quality of the stabilizers may influence toner production, including the particle size of toners produced with these materials. For example, β-CEA may be produced from acrylic acid through a Michael addition reaction. Although reaction temperature can be an important factor in the carboxylic acid number of the β-CEA, with a higher temperature resulting in less carboxylic acid groups, in some cases with the same process time the Michael reaction can proceed at room temperature, at a much lower reaction rate, resulting in more carboxylic acid groups.

The quality of the β-CEA may thus be inconsistent from batch to batch, especially with respect to the variability in the number of carboxylic acid groups which may result, in part, from different processing temperatures. For example, when β-CEA contains more carboxylic acid groups, latexes produced with such stabilizers may possess a larger particle size, which may interfere with the formation of toner particles in an emulsion aggregation process. Thus, poor quality β-CEA may cause problems with latex synthesis, including lower quality yield, wider latex particle size distribution, shorter latex shelf life, more reactor fouling, and difficulties in controlling reaction temperature due to higher exothermic reactions.

In addition to this variability in quality, in some cases the β-CEA may also possess impurities therein which result in latex particles of large sizes, in embodiments greater than about 300 nm, which may be undesirable.

Seed Particle

In accordance with the present disclosure, it has been surprisingly found that the use of a gel latex in forming seed resin particles in situ during a semi-continuous emulsion aggregation process for forming a latex may minimize and/or avoid problems with variabilities or impurities in a stabilizer such as β-CEA and/or other materials utilized to form a latex, and a latex with desirable particle sizes may thus be produced. A "seed resin," sometimes referred to herein, in embodiments, as a "seed particle," may include, in embodiments, in the case of forming a seed particle in situ (within the same reactor, i.e., using only one reactor to produce a single latex per batch process), a gel latex described above optionally in combination with a high quality or poor quality stabilizer such as β-CEA.

In accordance with the present disclosure, the monomers may be placed in a reactor, crosslinked with a crosslinker, and initiated with an appropriate initiator so that gel latex seed particles may be formed, having a size of from about 20 nm to about 100 nm. Once the gel latex seed particles have formed, the remainder of the monomers may then be added over a period of time to grow the seed particles into a final usable latex size, in embodiments from about 120 nm to about 800 nm, in other embodiments from about 150 nm to about 500 nm, which may be suitable for use in making a toner particle in the EA process. The molecular weight of the latex particles thus produced may be from about 20 kpse to about 100 kpse, in embodiments from about 25 kpse to about 60 kpse. The particles of the resulting latex may have a narrow particle size distribution, sometimes referred to as a geometric size distribution (GSD), of from about 1.02 to about 1.2, in embodiments from about 1.03 to about 1.15, as determined by use of a MicroTrac Ultra Fine Particle Analyzer.

In embodiments, the stabilizer such as β-CEA may be added at the beginning of the formation of the gel latex or, in embodiments, the stabilizer may be added subsequent to the formation of the gel latex. In embodiments a mixture of gel latex and stabilizer may first be formed, followed by the addition of monomers utilized to form the latex. In other embodiments, a gel latex may be utilized to form a seed particle during a semi-continuous emulsion aggregation process, after which the β-CEA known to produce particles that are too large is added.

In the emulsion polymerization process, the reactants may be added to a suitable reactor, such as a mixing vessel. The appropriate amount of at least two monomers, in embodiments from about two to about ten monomers, crosslinker, surfactant(s), stabilizer of the present disclosure, initiator, if any, chain transfer agent, if any, and the like may be combined in the reactor and the emulsion polymerization process may be allowed to begin. In embodiments, at least two monomers utilized to form the latex and the stabilizer may be added to the reactor, followed by the addition of crosslinker. An initiator may then be added to the reactor, with optional surfactants and chain transfer agents, and polymerization may occur to form a gel latex, which may also be referred to herein as a seed resin or seed particle. Additional monomers and stabilizer may be added to the reactor and a latex resin may be recovered. Reaction conditions selected for effecting the emulsion polymerization include temperatures of, for example, from about 45° C. to about 120° C., in embodiments from about 60° C. to about 90° C.

Seed Master Batch

In other embodiments, problems with variability or impurities in the β-CEA may be minimized or avoided, and toners with desirable particle sizes may be produced, by forming, in a separate reactor, a stock seed master batch including the gel latex described above, optionally in combination with a stabilizer such as β-CEA. A "seed master batch" may include, in embodiments, at least two separate reactor syntheses. The first synthesis involves making a seed master batch to replace the process of making the seed particle in situ in the single reactor process as described above. This seed master batch may then be used to synthesize many latex batches by using a portion of this seed master batch to start a new batch of latex in a second reactor. Thus, with a seed master batch, one can make a gel latex having particles with a size of from about 20 nm to about 100 nm in a large reactor, for example about 3000 gallons. A benefit of the seed master batch includes that the size, molecular weight and chemical composition of the gel latex utilized to form the seed particles are identical, regardless of whether one takes a sample of one gallon, 100 gallons, or one quart, from the seed master batch.

A portion of the gel latex from the seed master batch may then be utilized as a seed in forming latex particles in a second reactor. These latex particles, in turn, may be suitable for use in making toner particles. In embodiments, the seed from the seed master batch may contain the gel latex only, or both gel latex and a stabilizer such as β-CEA to enhance the stability of the seed during the first about 5 to about 30 minutes of main monomer addition.

In embodiments, the seed master batch may be formed by combining the monomers and crosslinker to form a gel latex. A stabilizer, including β-CEA known to produce particles that are too large, may be added during the formation of the gel latex or subsequent thereto.

Once the seed master batch has been formed, a portion of the master batch can then be used to seed additional batches of emulsion aggregation latex resins. For example, a portion of this master batch may then be added to a reactor, followed by additional monomers and reactants utilized to form the latex resin, including a stabilizer as described above, thereby forming the desired latex resin. This may enable the formation of particles that are consistent in size and count from batch to batch, as the same seed is utilized in formation of the latex resin. The latex thus produced may then be used to form toner particles of a desired size, in embodiments suitable for use in forming a toner composition.

As noted above, the seed master batch may include a gel latex with stabilizer, or without stabilizer. Where the gel latex includes stabilizer, the addition of more stabilizer with the remaining monomers utilized to form the latex resin is optional during the monomer addition. Where the gel latex lacks a stabilizer, stabilizer should be added with the remaining monomers utilized to form the latex resin during the monomer addition.

As noted above, a portion of the master batch may then be added to a reactor, followed by adding optional stabilizer and additional monomers utilized to form the latex resin, thereby forming the desired latex resin.

The gel latex may provide a highly stable seed particle during the main monomer addition. Thus, with a gel latex forming a seed master batch, large particle formation associated with a bad β-CEA can be controlled.

In forming the seed master batch, the reactants may be added to a suitable reactor, such as a mixing vessel. The appropriate amount of at least two monomers, in embodiments from about two to about ten monomers, surfactant(s), crosslinker, initiator, if any, chain transfer agent, if any, optionally a stabilizer as described above, and the like may be combined in the reactor and the formation of a seed master batch by emulsion polymerization allowed to begin. Reaction conditions selected for effecting the emulsion polymerization in forming the seed master batch are similar to those for forming a seed resin in situ, and may include temperatures of, for example, from about 45° C. to about 120° C., in embodiments from about 60° C. to about 90° C.

After formation of the seed master batch, as noted above, in embodiments a portion of the master batch may be added to a reactor as a seed, with the addition of reactants such as additional monomers, surfactant(s), initiator, if any, chain transfer agent, if any, optionally a stabilizer, and the like. The reactants may be combined in the reactor and the emulsion polymerization process may be allowed to begin. Reaction conditions selected for effecting the emulsion polymerization include temperatures of, for example, from about 45° C. to about 120° C., in embodiments from about 60° C. to about 90° C.

The use of the gel latex as disclosed herein minimizes the negative effects of a β-CEA otherwise known to produce latex resins having particle sizes that are too large. Thus, by using the gel latex to form a seed particle in situ, or to form a master batch, latex particles may be obtained having acceptable sizes for producing toners, in embodiments from about 80 nm to about 800 nm, in other embodiments from about 170 nm to about 240 nm, even where a stabilizer known to otherwise produce toners having particle sizes that are too large is utilized.

Thus, with a gel latex utilized as a seed resin or seed particle, the formation of large latex resin particles associated with a bad β-CEA can be controlled and the particle size of the resulting latex resin may be reduced.

After formation of the latex particles, the latex resin particles may be used to form a toner. In embodiments, the toners may be an emulsion aggregation type toner that may be prepared by the aggregation and fusion of the latex resin particles of the present disclosure with a colorant, and one or more additives such as stabilizers of the present disclosure, surfactants, coagulants, waxes, surface additives, and optionally mixtures thereof.

Colorants

The latex particles produced as described above may be added to a colorant to produce a toner. In embodiments the colorant may be in a dispersion. The colorant dispersion may include, for example, submicron colorant particles having a size of, for example, from about 50 to about 500 nanometers and, in embodiments, of from about 100 to about 400 nanometers in volume average diameter. The colorant particles may be suspended in an aqueous water phase containing an anionic surfactant, a nonionic surfactant, or mixtures thereof. Suitable surfactants include any of those surfactants described above. In embodiments, the surfactant may be ionic and may be present in a dispersion in an amount from about 0.1 to about 25 percent by weight of the colorant, and in embodiments from about 1 to about 15 percent by weight of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants, and the like.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido)phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55 wherein the dyes are selected in various suitable amounts, for example from about 0.5 to about 20 percent by weight of the toner, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant.

The colorant may be present in the toner of the disclosure in an amount of from about 1 to about 25 percent by weight of toner, in embodiments in an amount of from about 2 to about 15 percent by weight of the toner.

The resulting latex, optionally in a dispersion, and colorant dispersion may be stirred and heated to a temperature of from about 35° C. to about 70° C., in embodiments of from about 40° C. about 65° C., resulting in toner aggregates of from about 2 microns to about 10 microns in volume average diameter, and in embodiments of from about 5 microns to about 8 microns in volume average diameter.

Wax

Wax dispersions may be added to a latex resin described above to produce toners of the present disclosure. Suitable waxes include, for example, submicron wax particles having a size of from about 50 to about 1000 nanometers, in embodiments of from about 100 to about 500 nanometers in volume average diameter, suspended in an aqueous phase of water and an ionic surfactant, nonionic surfactant, or mixtures thereof. Suitable surfactants include those described above. The ionic surfactant or nonionic surfactant may be present in an amount of from about 0.1 to about 20 percent by weight, and in embodiments of from about 0.5 to about 15 percent by weight of the wax.

The wax dispersion according to embodiments of the present disclosure may include, for example, a natural vegetable wax, natural animal wax, mineral wax, and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and mixtures thereof.

Examples of polypropylene and polyethylene waxes include those commercially available from Allied Chemical and Baker Petrolite, including POLYWAX 725®, a polyethylene wax from Baker Petrolite, wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. In embodiments, commercially available polyethylene waxes may possess a molecular weight (Mw) of from about 100 to about 5000, and in embodiments of from about 250 to about 2500, while the commercially available polypropylene waxes may have a molecular weight of from about 200 to about 10,000, and in embodiments of from about 400 to about 5000.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, JONCRYL 74, 89, 130, 537, and 538, all available from SC Johnson Wax, or chlorinated polypropylenes and polyethylenes commercially available from Allied Chemical, Petrolite Corporation, and SC Johnson Wax.

The wax may be present in an amount of from about 0.1 to about 30 percent by weight of the toner, and in embodiments from about 2 to about 20 percent by weight of the toner.

Coagulants

In embodiments, a coagulant may be added during or prior to aggregating the latex and the aqueous colorant dispersion. The coagulant may be added over a period of time of from about 1 minute to about 60 minutes, in embodiments from about 1.25 minutes to about 20 minutes, depending on the processing conditions.

Examples of coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, combinations thereof, and the like. One suitable coagulant is PAC, which is commercially available and can be prepared by the controlled hydrolysis of aluminum chloride with sodium hydroxide. Generally, PAC can be prepared by the addition of two moles of a base to one mole of aluminum chloride. The species is soluble and stable when dissolved and stored under acidic conditions if the pH is less than about 5. The species in solution is believed to be of the formula $Al_{13}O_4(OH)_{24}(H_2O)_{12}$, with about 7 positive electrical charges per unit.

In embodiments, suitable coagulants include a polymetal salt such as, for example, polyaluminum chloride (PAC), polyaluminum bromide, or polyaluminum sulfosilicate. The polymetal salt can be in a solution of nitric acid, or other diluted acid solutions such as sulfuric acid, hydrochloric acid, citric acid or acetic acid. The coagulant may be added in amounts from about 0.01 to about 5 percent by weight of the toner, in embodiments from about 0.1 to about 3 percent by weight of the toner.

Aggregating Agents

Any aggregating agent capable of causing complexation might be used in forming toners of the present disclosure. Both alkali earth metal or transition metal salts can be utilized as aggregating agents. In embodiments, alkali (11) salts can be selected to aggregate latex resin colloids with a colorant to enable the formation of a toner composite. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally combinations thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, combinations thereof, and the like.

pH Adjustment Agent

In some embodiments a pH adjustment agent may be added to the latex, colorant, and optional additives, to control the rate of the emulsion aggregation process. The pH adjustment agent utilized in the processes of the present disclosure can be any acid or base that does not adversely affect the products being produced. Suitable bases can include metal hydroxides, such as sodium hydroxide, potassium hydroxide, ammonium hydroxide, and optionally combinations thereof. Suitable acids include nitric acid, sulfuric acid, hydrochloric acid, citric acid, acetic acid, and optionally combinations thereof.

Additives

The toner may also include charge additives in effective amounts of, for example, from about 0.1 to about 10 weight percent of the toner, in embodiments from about 0.5 to about 7 weight percent of the toner. Suitable charge additives include alkyl pyridinium halides, bisulfates, the charge control additives of U.S. Pat. Nos. 3,944,493; 4,007,293; 4,079,014; 4,394,430 and 4,560,635, the entire disclosures of each of which are hereby incorporated by reference in their entirety, negative charge enhancing additives like aluminum complexes, any other charge additives, combinations thereof, and the like.

Further optional additives include any additive to enhance the properties of toner compositions. Included are surface additives, color enhancers, and the like. Surface additives that can be added to the toner compositions after washing or drying include, for example, metal salts, metal salts of fatty acids, colloidal silicas, metal oxides, strontium titanates, combinations thereof, and the like, which additives are each usually present in an amount of from about 0.1 to about 10 weight percent, in embodiments from about 0.5 to about 7 weight percent of the toner. Examples of such additives include, for example, those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. No. 6,190,815 and U.S. Pat. No. 6,004,714, the disclosures of each of which are hereby incorporated by reference in their entirety, can also be selected in amounts, for example, of from about 0.05 to about 5 percent by weight, in embodiments from about 0.1 to about 2 percent by weight of the toner, which additives can be added during the aggregation or blended into the formed toner product.

Once the appropriate final size of the toner particles is achieved, the pH of the mixture may be adjusted with a base to a value of from about 3.5 to about 7, and in embodiments from about 4 to about 6.5. The base may include any suitable base such as, for example, alkali metal hydroxides such as, for example, sodium hydroxide, potassium hydroxide, and ammonium hydroxide. The alkali metal hydroxide may be added in amounts from about 0.1 to about 30 percent by weight of the mixture, in embodiments from about 0.5 to about 15 percent by weight of the mixture.

The resultant blend of latex, optionally in a dispersion, stabilizer, optional wax, colorant dispersion, optional coagulant, and optional aggregating agent, may then be stirred and heated to a temperature below the Tg of the latex, in embodiments from about 30° C. to about 70° C., in embodiments of from about 40° C. to about 65° C., for a period of time of from about 0.2 hours to about 6 hours, in embodiments from about 0.3 hours to about 5 hours, to form aggregated particles.

In embodiments, an optional shell may then be formed on the aggregated particles. Any latex described above to form the latex may be utilized to form the shell latex. In embodiments, a styrene-n-butyl acrylate copolymer may be utilized to form the shell latex. In embodiments, the latex utilized to form the shell may have a glass transition temperature of from about 35° C. to about 75° C., in embodiments from about 40° C. to about 70° C.

Where used, the shell latex may be applied by any method within the purview of those skilled in the art, including dipping, spraying, and the like. The shell latex may be applied until the desired final size of the toner particles is achieved, in embodiments from about 2 microns to about 10 microns, in other embodiments from about 4 microns to about 8 microns.

The mixture of latex, colorant, optional wax, and any additives, is subsequently coalesced. Coalescing may include stirring and heating at a temperature of from about 80° C. to about 99° C., for a period of from about 0.5 to about 12 hours, and in embodiments from about 1 to about 6 hours. Coalescing may be accelerated by additional stirring.

In embodiments, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The mixture may be cooled, washed and dried. Cooling may be at a temperature of from about 20° C. to about 40° C., in embodiments from about 22° C. to about 30° C., over a period of time of from about 1 hour to about 8 hours, in embodiments from about 1.5 hours to about 5 hours.

In embodiments, cooling a coalesced toner slurry may include quenching by adding a cooling media such as, for example, ice, dry ice and the like, to effect rapid cooling to a temperature of from about 20° C. to about 40° C., in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture may not be feasible or practical, neither by the introduction of a cooling medium into the toner mixture, or by the use of jacketed reactor cooling.

The toner slurry may then be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

The toner of the present disclosure may possess particles having a size of from about 3.5 to about 10 microns, in embodiments from about 4.5 to about 8.5 microns. The resulting toner particles may have a circularity of from about 0.9 to about 0.99, in embodiments of from about 0.94 to about 0.98. When the spherical toner particles have a circularity in this range, the spherical toner particles remaining on the surface of the image holding member pass between the contacting portions of the imaging holding member and the contact charger, the amount of deformed toner is small, and therefore generation of toner filming can be prevented so that a stable image quality without defects can be obtained over a long period.

Uses

Toner in accordance with the present disclosure can be used in a variety of imaging devices including printers, copy machines, and the like. The toners generated in accordance with the present disclosure are excellent for imaging processes, especially xerographic processes, which may operate with a toner transfer efficiency in excess of about 90 percent, such as those with a compact machine design without a cleaner or those that are designed to provide high quality colored images with excellent image resolution, acceptable signal-to-noise ratio, and image uniformity. Further, toners of the present disclosure can be selected for electrophotographic imaging and printing processes such as digital imaging systems and processes.

The imaging process includes the generation of an image in an electronic printing apparatus and thereafter developing the image with a toner composition of the present disclosure. The formation and development of images on the surface of photoconductive materials by electrostatic means is within the purview of those skilled in the art. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material referred to in the art as "toner". The toner will normally be attracted to the discharged areas of the layer, thereby forming a toner image corresponding to the latent electrostatic image. This powder image may then be transferred to a support surface such as paper. The transferred image may subsequently be permanently affixed to the support surface as by heat.

Developer compositions can be prepared by mixing the toners obtained with the embodiments of the present disclosure with known carrier particles, including coated carriers, such as steel, ferrites, and the like. See, for example, U.S. Pat. Nos. 4,937,166 and 4,935,326, the disclosures of each of which are hereby incorporated by reference in their entirety. The toner-to-carrier mass ratio of such developers may be from about 2 to about 20 percent, and in embodiments from about 2.5 to about 5 percent of the developer composition. The carrier particles can include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidene fluoride, mixtures of resins not in close proximity in the triboelectric series such as polyvinylidene fluoride and acrylics, thermosetting resins such as acrylics, mixtures thereof and other known components.

Development may occur via discharge area development. In discharge area development, the photoreceptor is charged and then the areas to be developed are discharged. The development fields and toner charges are such that toner is repelled by the charged areas on the photoreceptor and attracted to the discharged areas. This development process is used in laser scanners.

Development may also be accomplished by the magnetic brush development process disclosed in U.S. Pat. No. 2,874,063, the disclosure of which is hereby incorporated by reference in its entirety. This method entails the carrying of a developer material containing toner of the present disclosure and magnetic carrier particles by a magnet. The magnetic field of the magnet causes alignment of the magnetic carriers in a brush like configuration, and this "magnetic brush" is brought into contact with the electrostatic image bearing surface of the photoreceptor. The toner particles are drawn from the brush to the electrostatic image by electrostatic attraction to the discharged areas of the photoreceptor, and development of the image results. In embodiments, the conductive magnetic brush process is used wherein the developer comprises conductive carrier particles and is capable of conducting an electric current between the biased magnet through the carrier particles to the photoreceptor.

Imaging

Imaging methods are also envisioned with the toners disclosed herein. Such methods include, for example, some of the above patents mentioned above and U.S. Pat. Nos. 4,265,990, 4,858,884, 4,584,253 and 4,563,408, the disclosures of each of which are hereby incorporated by reference in their entirety. The imaging process includes the generation of an image in an electronic printing magnetic image character recognition apparatus and thereafter developing the image with a toner composition of the present disclosure. The formation and development of images on the surface of photoconductive materials by electrostatic means is within the purview of those skilled in the art. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner will normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer. Other suitable fixing means such as solvent or overcoating treatment may be substituted for the foregoing heat fixing step.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Comparative Example 1

A latex resin was prepared as follows. A 2 liter jacketed stainless steel reactor was fitted with a double P-4 impeller set at about 300 revolutions per minute (rpm). The reactor was charged with about 736 grams of deionized water and about 1.1 grams of DOWFAX™ 2A1 (47% aqueous), an alkyldiphenyloxide disulfonate from The Dow Chemical Company. The materials were deaerated for about 30 minutes while the contents of the reactor were raised to about 75° C.

A monomer emulsion was prepared by agitating a monomer mixture of about 630 grams of styrene, about 140 grams of n-butyl acrylate, about 23.2 grams of beta-carboxyethyl acrylate (β-CEA) and about 5.4 grams of 1-dodecanethiol with an aqueous solution of about 15.3 grams of DOWFAX™ 2A1 and about 368 grams of deionized water at about 300 rpm at room temperature, from about 20° C. to about 25° C.

About 11.9 grams of the above emulsion was added into the reactor and was stirred for about 8 minutes at about 75° C. An initiator solution prepared from about 11.6 grams of ammonium persulfate in about 57 grams of deionized water was added over a period of time of about 20 minutes. Stirring continued for an additional 20 minutes to allow seed particle formation. The first half of the remaining monomer emulsion was fed into the reactor over about 130 minutes.

After that, about 6.5 grams 1-dodecanethiol were added into the remaining monomer emulsion, and stirred at about 300 rpm for about 10 minutes. Then, the new monomer emulsion was fed into the reactor over about 90 minutes. At the conclusion of the monomer feed, the emulsion was postheated at about 75° C. for about 3 hours and then cooled. The final latex was characterized for particle size utilizing a MicroTrac, molecular weight by gel permeation chromatography (GPC), pH, and % of sedimentation.

Two samples were prepared following the above procedures: one possessed a β-CEA that was known to produce particles of an unacceptable size of from about 250 nm to about 300 nm (sometimes referred to herein as a bad β-CEA); the other possessed a β-CEA that was known to produce particles of an acceptable size of from about 180 nm to about 220 nm (sometimes referred to herein as a good β-CEA).

Example 1

Latexes were prepared as generally described above in Comparative Example 1, utilizing a gel latex as a seed. The gel latex was produced as follows. A surfactant solution containing about 0.76 grams TAYCA 2600BN and about 141.6 grams of water was charged in a 2 liter jacketed stainless steel reactor with double P-4 impeller set at about 350 rpm. The solution was purged with nitrogen for about 30 minutes and the temperature was increased to about 75° C. The monomer emulsion was prepared by mixing about 45 grams of styrene, about 24.2 grams of butyl acrylate, about 2.08 grams of beta-CEA, and about 0.69 grams of divinyl benzene. This mixture was added to a TAYCA 2600BN aqueous solution (about 0.75 grams of TAYCA 2600BN and about 71.5 grams of water) for about 30 minutes. Then, about 29 grams of the above monomer emulsion was added in the reactor and left for about 10 minutes. About 13.7 grams of ammonium persulfate solution (about 1.18 grams of ammonium persulfate and about 12.5 grams of water) was fed into the reactor over a period of about 3 minutes and left for about 10 minutes. The rest of monomer emulsion was then added in the reactor at a rate of about 5.6 grams/minute. The reactor was held at this temperature for about 30 minutes after all the emulsion was introduced and then cooled to room temperature (about 20° C. to about 25° C.) to produce a gel latex.

To produce the resins, about 30 grams of the above premade gel latex having a particle size of about 45 nm, and solids content of about 25 percent by weight, was combined with about 716 grams of deionized water in the reactor described above in Comparative Example 1 and deaerated for about 30 minutes while the temperature was raised to about 75° C. The same initiator solution of Comparative Example 1 (about 11.6 grams of ammonium persulfate in about 57 grams of deionized water) was added over about 20 minutes with stirring for an additional 20 minutes. After that, the same emulsion as Comparative Example 1 (a monomer mixture of about 630 grams of styrene, about 140 grams of n-butyl acrylate, about 23.2 grams of beta-carboxyethyl acrylate (β-CEA), and about 5.4 grams of 1-dodecanethiol combined with an aqueous solution of about 15.3 grams of DOWFAX™ 2A1 and about 368 grams of deionized water that had been mixed at about 300 rpm at room temperature) was fed into the reactor at the rate described above in Comparative Example 1.

As in Comparative Example 1 above, the final latex was characterized for particle size utilizing a MicroTrac, molecular weight by gel permeation chromatography (GPC), pH, and % of sedimentation. Two samples were prepared: one possessed a β-CEA that was known to produce particles of an unacceptable size of from about 250 nm to about 300 nm (sometimes referred to herein as a bad β-CEA); the other possessed a β-CEA that was known to produce particles of an acceptable size of from about 180 nm to about 220 nm (sometimes referred to herein as a good β-CEA).

The data obtained for the latexes of Comparative Example 1 and this Example are summarized below in Table 1 and in FIG. 1 (depicting the effect of β-CEA quality and presence of gel latex on particle size) and FIG. 2 (depicting the effect of β-CEA quality and presence of gel latex on molecular weight (Mw) of particles).

TABLE 1

| | | | Final latex properties | | | | |
| --- | --- | --- | --- | --- | --- | --- | --- |
| | | | | Final Latex Properties | | | |
| Sample | β-CEA Quality (Lot #) | Gel latex seed (gram) | Particle Size (nm) | Size distribution (mv/mn) | Mw (k) | Mn (k) | PDI (Mw/Mn) |
| Comparative Example 1, Sample A | Bad (05B1011) | 0 | 278 | 1.27 | 43.5 | 13 | 3.346 |
| Comparative Example 1, Sample B | Good (07C0502) | 0 | 209 | 1.05 | 35.4 | 12.1 | 2.926 |
| Example 1, Sample A | Bad (05B1001) | 30 | 201 | 1.03 | 35.9 | 12.3 | 2.919 |
| Example 1, Sample B | Good (07C0502) | 30 | 210 | 1.05 | 36.1 | 12.8 | 2.820 |

Figure 1:
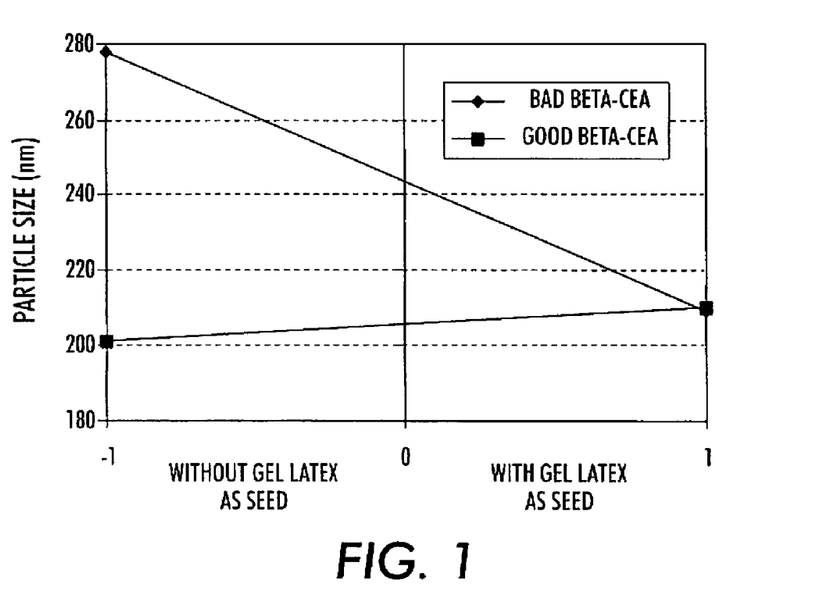
FIG. 1 is a graph depicting particle sizes of resins produced in accordance with the present disclosure compared with control resins.
Figure 2:
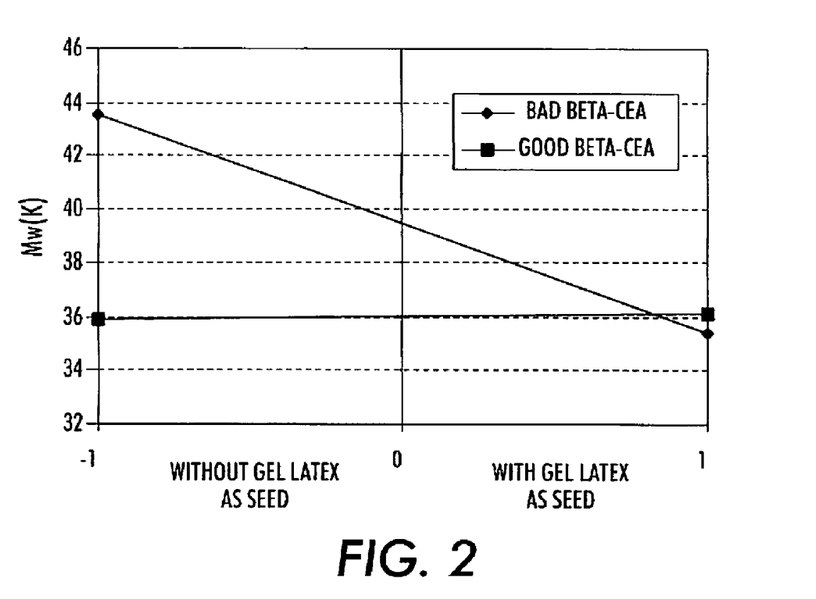
FIG. 2 is a graph depicting molecular weights of resins produced in accordance with the present disclosure compared with control resins.

As can be seen from the above Table 1 and FIGS. 1 and 2, without gel latex as seed, the final latex particle size and Mw varied with the β-CEA quality. With bad β-CEA, the final latex had a larger particle size, a higher Mw, broader size and molecular weight distributions, and higher sedimentation % than good β-CEA under the same process conditions. When 1 part per hundred (pph) of gel latex was added as seed (based on the amount of styrene and n-butyl acrylate), the final latex properties were no longer sensitive to the quality of the β-CEA. Additionally, the final latexes showed narrower size and molecular weight distribution, and much less sedimentation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
forming an emulsion by contacting monomer components of a latex resin with a stabilizer of the following formula:

where R1 is a hydrogen or methyl group; R2 and R3 are independently selected from alkyl groups containing about 1 to about 12 carbon atoms and a phenyl group; and n is from about 0 to about 20;
adding a portion of the emulsion to a reactor;
contacting the emulsion in the reactor with a crosslinker;
optionally adding an initiator to the reactor;
forming a seed particle comprising a gel latex in the reactor;
adding additional monomers comprising the latex resin and optionally additional stabilizer to the reactor; and
recovering the resulting latex resin and contacting the resulting latex resin with an optional colorant dispersion and an optional wax dispersion to form toner particles, wherein the gel latex is present in an amount sufficient to reduce the particle size of the resulting latex resin as compared to a latex resin prepared without said seed particle comprising said gel latex, and
wherein the stablizer used results in larger particle sizes when prepared without said seed particle comprising said gel latex.

2. The process of claim 1, wherein the stabilizer is selected from the group consisting of beta carboxyethyl acrylate, poly (2-carboxyethyl) acrylate, 2-carboxyethyl methacrylate, and combinations thereof.

3. The process of claim 1, wherein the latex resin is selected from the group consisting of styrenes, acrylates, methacrylates, butadienes, isoprenes, acrylic acids, methacrylic acids, acrylonitriles, and combinations thereof.

4. The process of claim 1, wherein the latex resin is selected from the group consisting of poly(styrene-co-alkyl acrylate), poly(styrene-co-butadiene),poly(styrene-co-alkyl methacrylate), poly(styrene-co-alkyl acrylate-co-acrylic acid),poly (styrene-co-1, 3-butadiene-co-acrylic acid), poly(styrene-co-alkyl methacrylate-co-acrylic acid), poly(alkyl methacrylate-co-alkyl acrylate), poly(alkyl methacrylate-co-aryl acrylate), poly(aryl methacrylate-co-alkyl acrylate), poly(alkyl methacrylate-co-acrylic acid), poly(styrene-co-alkyl acrylate-co-acrylonitrile-acrylic acid), poly (styrene-co-butadiene-co-acrylonitrile-co-acrylic acid), poly(alkyl acrylate-co-acrylonitrile-co-acrylic acid), poly(methylstyrene-co-butadiene), poly(methyl methacrylate-co-butadiene), poly (ethyl methacrylate-co-butadiene), poly(propyl methacrylate-co-butadiene), poly(butyl methacrylate-co-butadiene), poly(methyl acrylate-co-butadiene), poly(ethyl acrylate-co-butadiene), poly(propyl acrylate-co-butadiene), poly(butyl acrylate-co-butadiene), poly(styrene-co-isoprene), poly(methylstyrene-co-isoprene), poly(methyl methacrylate-co-isoprene), poly(ethyl methacrylate-co-isoprene), poly(propyl methacrylate -co-isoprene), poly(butyl methacrylate-co-isoprene), poly(methyl acrylate -co-isoprene), poly(ethyl acrylate-co-isoprene), poly(propyl acrylate-co-isoprene), poly(butyl acrylate-co-isoprene), poly(styrene-co-propyl acrylate), poly(styrene-co-butyl acrylate), poly(styrene-co-butadiene-co-methacrylic acid), poly(styrene-co-butyl acrylate-co-acrylic acid), poly(styrene-co-butyl acrylate-co-methacrylic acid), poly(styrene-co-butyl acrylate-co-acrylonitrile), poly(styrene-co-butyl acrylate-co-acrylonitrile-acrylic acid), poly(styrene-co-butyl methacrylate), poly(styrene-co-butyl methacrylate-co-acrylic acid), poly(butyl methacrylate-co-butyl acrylate), poly(butyl methacrylate-co-acrylic acid), poly(acrylonitrile-co-butyl acrylate-co-acrylic acid), and combinations thereof.

5. The process of claim 1, wherein the crosslinker is selected from the group consisting of divinyl benzene, dodecane diacrylate, 1,4-butane diacrylate, decanediol diacrylate, azidobenzoyl hydrazide, 4-(p-azidosalicylamido)butylamine, 1-ethyl-3-(3-dimethylaminopropyl)carbodiimide hydrochloride, and combinations thereof, present in an amount of from about 0.01 percent by weight to about 25 percent by weight of the gel latex.

6. The process of claim 1, wherein the latex resin comprises particles having a size of from about 120 nm to about 800 nm.

7. The process of claim 1, wherein said toner particles have a volume average diameter of from about 3.5 microns to about 10 microns, and a circularity from about 0.9 to about 0.99.

8. A process comprising:
forming an emulsion by contacting monomer components of a latex resin with a crosslinker;
adding an initiator to the emulsion to form a master batch comprising a gel latex;
adding a portion of the master batch to a reactor;
adding additional monomer components of the latex resin and a stabilizer of the following formula:

where R1 is a hydrogen or methyl group; R2 and R3 are independently selected from alkyl groups containing from about 1 to about 12 carbon atoms and a phenyl group; and n is a number of from about 0 to about 20; and recovering the resulting latex resin and contacting the resulting latex resin with an optional colorant dispersion and an optional wax dispersion to form toner particles, wherein the gel latex is present in an amount sufficient to reduce the particle size of the resulting latex resin as compared to a latex resin prepared without said master batch comprising a gel latex, and wherein the stablizer used results in larger particle sizes when prepared without said master batch comprising said gel latex.

9. The process of claim 8, wherein forming the emulsion further comprises contacting the monomer components and crosslinker with the stabilizer.

10. The process of claim 8, wherein the stabilizer is selected from the group consisting of beta carboxyethyl acrylate, poly(2-carboxyethyl) acrylate, 2-carboxyethyl methacrylate, and combinations thereof.

11. The process of claim 8, wherein the latex resin is selected from the group consisting of styrenes, acrylates, methacrylates, butadienes, isoprenes, acrylic acids, methacrylic acids, acrylonitriles, and combinations thereof.

12. The process of claim 8, wherein the latex resin is selected from the group consisting of poly(styrene-co-alkyl acrylate), poly(styrene-co-butadiene), poly(styrene-co-alkyl methacrylate), poly(styrene-co-alkyl acrylate-co-acrylic acid), poly (styrene -co-1,3-butadiene-co-acrylic acid), poly (styrene-co-alkyl methacrylate-co-acrylic acid), poly(alkyl methacrylate-co-alkyl acrylate), poly(alkyl methacrylate-co-aryl acrylate), poly(aryl methacrylate-co-alkyl acrylate), poly (alkyl methacrylate-co-acrylic acid), poly(styrene-co-alkyl acrylate -co-acrylonitrile-acrylic acid), poly(styrene-co-butadiene-co-acrylonitrile-co-acrylic acid), poly(alkyl acrylate-co-acrylonitrile-co-acrylic acid), poly(methylstyrene-co-butadiene), poly(methyl methacrylate-co-butadiene), poly(ethyl methacrylate-co-butadiene), poly(propyl methacrylate-co-butadiene), poly(butyl methacrylate-co-butadiene), poly(methyl acrylate -co-butadiene), poly(ethyl acrylate-co-butadiene), poly(propyl acrylate-co-butadiene), poly(butyl acrylate-co-butadiene), poly(styrene-co-isoprene), poly(methylstyrene-co-isoprene), poly(methyl methacrylate-co-isoprene), poly(ethyl methacrylate-co-isoprene), poly(propyl methacrylate-co-isoprene), poly(butyl methacrylate-co-isoprene), poly(methyl acrylate -co-isoprene), poly(ethyl acrylate-co-isoprene), poly(propyl acrylate-co-isoprene), poly(butyl acrylate-co-isoprene), poly(styrene-co-propyl acrylate), poly(styrene-co-butyl acrylate) poly(styrene -co-butadiene-co-methacrylic acid), poly(styrene-co-butyl acrylate-co-acrylic acid), poly(styrene-co-butyl acrylate-co-methacrylic acid), poly(styrene-co-butyl acrylate-co-acrylonitrile), poly(styrene-co-butyl acrylate-co-acrylonitrile-acrylic acid), poly(styrene-co-butyl methacrylate), poly(styrene-co-butyl methacrylate-co-acrylic acid), poly(butyl methacrylate-co-butyl acrylate), poly(butyl methacrylate-co-acrylic acid), poly(acrylonitrile-co-butyl acrylate-co-acrylic acid), and combinations thereof.

13. The process of claim 8, wherein the crosslinker is selected from the group consisting of divinyl benzene, dodecane diacrylate, 1,4-butane diacrylate, decanediol diacrylate, azidobenzoyl hydrazide, 4-(p-azidosalicylamido)butylamine, 1-ethyl-3-(3-dimethylaminopropyl)carbodiimide hydrochloride, and combinations thereof, present in an amount of from about 0.01 percent by weight to about 25 percent by weight of the gel latex.

14. The process of claim 8, wherein the crosslinker is present in an amount from about 0.5 to about 15 percent by weight of the gel latex.

15. The process of claim 8, wherein the latex resin comprises particles having a size of from about 120 nm to about 800 nm.

16. The process of claim 8, wherein said toner particles have a volume average diameter of from about 3.5 microns to about 10 microns, and a circularity from about 0.9 to about 0.99.

17. A process comprising:
forming an emulsion by contacting monomers selected from the group consisting of styrenes, acrylates, methacrylates, butadienes, isoprenes, acrylic acids, methacrylic acids, acrylonitriles, and combinations thereof, with a crosslinker selected from the group consisting of divinyl benzene, dodecane diacrylate, 1,4-butane diacrylate, decanediol diacrylate, azidobenzoyl hydrazide, 4-(p-azidosalicylamido)butylamine, 1-ethyl-3-(3-dimethylaminopropyl)carbodiimide hydrochloride, and combinations thereof, and a stabilizer comprising beta carboxyethyl acrylate;

adding an initiator to the emulsion to form a master batch comprising a gel latex;

adding a portion of the master batch to a reactor;

adding additional monomers and optionally additional stabilizer to the reactor; and recovering a resulting latex resin and contacting the resulting latex resin with an optional colorant dispersion and an optional wax dispersion to form toner particles, wherein the gel latex is present in an amount sufficient to reduce the particle size of the resulting latex resin as compared to a latex resin prepared without said master batch comprising a gel latex, and wherein the stabilizer used results in larger particle sizes when prepared without said master batch comprising said gel latex.

18. The process of claim 17, wherein the latex resin is selected from the group consisting of poly(styrene-co-alkyl acrylate), poly(styrene-co-butadiene), poly(styrene-co-alkyl methacrylate), poly(styrene-co-alkyl acrylate-co-acrylic acid), poly(styrene-co-1,3-butadiene-co-acrylic acid), poly (styrene-co-alkyl methacrylate -co-acrylic acid), poly(alkyl methacrylate-co-alkyl acrylate), poly(alkyl methacrylate-co-aryl acrylate), poly(aryl methacrylate-co-alkyl acrylate), poly (alkyl methacrylate-co-acrylic acid), poly(styrene-co-alkyl acrylate-co-acrylonitrile-acrylic acid), poly(styrene-co-butadiene-co-acrylonitrile-co-acrylic acid), poly(alkyl acrylate-co-acrylonitrile-co-acrylic acid), poly(methylstyrene-co-butadiene), poly(methyl methacrylate-co-butadiene), poly(ethyl methacrylate-co-butadiene), poly(propyl methacrylate-co-butadiene), poly(butyl methacrylate-co-butadiene), poly(methyl acrylate -co-butadiene), poly(ethyl acrylate-co-butadiene), poly(propyl acrylate-co-butadiene), poly(butyl acrylate-co-butadiene), poly(styrene-co-isoprene), poly(methylstyrene-co-isoprene), poly(methyl methacrylate-co-isoprene), poly(ethyl methacrylate-co-isoprene), poly(propyl methacrylate-co-isoprene), poly(butyl methacrylate-co-isoprene), poly(methyl acrylate -co-isoprene), poly(ethyl acrylate-co-isoprene), poly(propyl acrylate-co-isoprene), poly(butyl acrylate-co-isoprene), poly(styrene-co-propyl acrylate), poly(styrene-co-butyl acrylate), poly(styrene-co-butadiene-co-methacrylic acid), poly(styrene-co-butyl acrylate-co-acrylic acid), poly(styrene-co-butyl acrylate-co-methacrylic acid), poly(styrene-co-butyl acrylate-co-acrylonitrile), poly(styrene-co-butyl acrylate-co-acrylonitrile-acrylic acid), poly(styrene-co-butyl methacrylate), poly(styrene-co-butyl methacrylate-co-acrylic acid), poly(butyl methacrylate-co-butyl acrylate), poly(butyl methacrylate-co-acrylic acid), poly(acrylonitrile-co-butyl acrylate-co-acrylic acid), and combinations thereof.

19. The process of claim 17, wherein the crosslinker is present in an amount of from about 0.01 percent by weight to about 25 percent by weight of the gel latex and the latex resin comprises particles having a size of from about 120 nm to about 800 nm.

20. The process of claim 17, wherein said toner particles have a volume average diameter of from about 3.5 microns to about 10 microns, and a circularity from about 0.9 to about 0.99.

* * * * *